United States Patent [19]
Sturtevant et al.

[11] Patent Number: 5,858,508
[45] Date of Patent: *Jan. 12, 1999

[54] METHOD OF FORMING ANTISLIP SURFACES ON THERMOFORMED PRODUCTS

[75] Inventors: Thomas M. Sturtevant, South China; Edward E. Cullivan, Palermo, both of Me.

[73] Assignee: Custom Plastics Molding, Inc., Benton, Me.

[*] Notice: The term of this patent shall not extend beyond the expiration date of Pat. No. 5,648,031.

[21] Appl. No.: 776,478
[22] PCT Filed: Jul. 19, 1995
[86] PCT No.: PCT/US95/09193

§ 371 Date: Apr. 21, 1997

§ 102(e) Date: Apr. 21, 1997

[87] PCT Pub. No.: WO96/03270

PCT Pub. Date: Feb. 8, 1996

Related U.S. Application Data

[63] Continuation of Ser. No. 282,219, Jul. 28, 1994, Pat. No. 5,648,031.

[51] Int. Cl.⁶ .................................................. B32B 9/00
[52] U.S. Cl. ........................... 428/147; 428/92; 428/141; 428/144; 428/143; 428/220; 428/327; 428/407; 264/80; 264/134; 264/309; 264/510; 156/62.2; 156/279; 156/280
[58] Field of Search .................................. 428/147, 143, 428/327, 198, 141, 144, 220, 323, 161, 163, 407, 92; 264/80, 134, 510, 309; 156/62.2, 280, 279; 521/49

[56] References Cited

U.S. PATENT DOCUMENTS

| | | | |
|---|---|---|---|
| 73,919 | 1/1868 | Newton | 36/32 R |
| 1,411,912 | 4/1922 | Fisher | 523/149 |
| 1,657,687 | 1/1928 | Schuler | 83/454 |
| 2,120,406 | 6/1938 | Hansen | 264/255 |
| 2,576,290 | 11/1951 | Fisher, Jr. | 427/261 |

(List continued on next page.)

FOREIGN PATENT DOCUMENTS

| | | |
|---|---|---|
| 0 490 608 | 6/1992 | European Pat. Off. . |
| 62-92215 | 4/1987 | Japan . |
| 63-129511 | 6/1988 | Japan . |
| 3-125311 | 5/1991 | Japan . |
| 5-94605 | 4/1993 | Japan . |
| 850791 | 10/1960 | United Kingdom . |

OTHER PUBLICATIONS

Materials Handbook, 12th Edition, McGraw–Hill Book Company, George S. Brady, Materials, Their Properties and Uses, pp. 406, 407 (1986).

(List continued on next page.)

Primary Examiner—Bruce H. Hess
Assistant Examiner—Abraham Bahta
Attorney, Agent, or Firm—W. F. Fasse; W. G. Fasse

[57] ABSTRACT

A process for selectively forming an antislip surface on a product thermoformed from a plastic sheet is applied to truck bed liners, for example. The surface of a plastic sheet of HDPE or other thermoplastic material is cleaned and masked, preparing a good molecular bonding surface on the selected surface areas. A sprayable or liquid polymer designed to achieve desired characteristics of hardness and toughness without brittleness, such as a thermosetting elastomeric polymer, is formed into droplets, which are sprayed or otherwise applied onto the exposed surface area. The droplets form a stippled pattern of primarily separate bumps, occupying substantially less than 50% of the exposed area. After partial hardening of the bumps, the plastic sheet is thermoformed to produce the thermoformed product. Thermoforming tightly bonds the droplets to the sheet, hardens the droplets forming macroscopic asperities, increases or enhances the three dimensional surface relief, and explodes some droplets with entrapped air to increase surface roughness.

29 Claims, 4 Drawing Sheets

U.S. PATENT DOCUMENTS

| | | | |
|---|---|---|---|
| 2,793,136 | 5/1957 | Root | 12/146 B |
| 3,124,807 | 3/1964 | Frenkel et al. | 156/274.4 |
| 3,148,103 | 9/1964 | Gallagher | 156/245 |
| 3,450,563 | 6/1969 | Krueger | 428/327 |
| 3,573,155 | 3/1971 | Mitchell | 36/32 R |
| 3,598,677 | 8/1971 | Bergmeister et al. | 36/32 R |
| 3,629,051 | 12/1971 | Mitchell | 264/53 |
| 3,629,380 | 12/1971 | Edwards | 106/36 |
| 3,878,147 | 4/1975 | Craven | 260/18 R |
| 4,103,315 | 7/1978 | Hempstead et al. | |
| 4,109,041 | 8/1978 | Tellman | 428/147 |
| 4,196,259 | 4/1980 | Augustin et al. | 428/192 |
| 4,329,312 | 5/1982 | Ganz | 264/306 |
| 4,420,513 | 12/1983 | Coke et al. | 427/407.1 |
| 4,488,918 | 12/1984 | Jofs | 156/79 |
| 4,592,583 | 6/1986 | Dresen et al. | 296/39 R |
| 4,614,686 | 9/1986 | Coke et al. | 428/327 |
| 4,692,370 | 9/1987 | Reckziegel et al. | 428/198 |
| 4,693,507 | 9/1987 | Dresen et al. | 296/39 R |
| 4,721,641 | 1/1988 | Bailey | 428/88 |
| 4,734,644 | 3/1988 | Imakoshi et al. | 324/252 |
| 4,745,139 | 5/1988 | Haasl et al. | 523/149 |
| 4,760,103 | 7/1988 | Kraft et al. | 523/150 |
| 5,014,147 | 5/1991 | Parkin et al. | 360/113 |
| 5,018,037 | 5/1991 | Krounbi et al. | |
| 5,053,253 | 10/1991 | Haenggi et al. | 427/204 |
| 5,094,902 | 3/1992 | Haenggi et al. | 428/150 |
| 5,110,657 | 5/1992 | Ainslie | 428/141 |
| 5,194,194 | 3/1993 | Kato et al. | 264/37 |
| 5,263,761 | 11/1993 | Hathaway et al. | 296/100 |
| 5,452,163 | 9/1995 | Coffey et al. | 360/113 |
| 5,648,031 | 7/1997 | Sturtevant et al. | 264/80 |

OTHER PUBLICATIONS

Modern Plastics Encyclopedia 1988, McGraw–Hill Inc., Oct. 87, vol. 64, No. 10A, pp. 356, 357, "Printing", Hans Deamer.

Robert P. Hunt, "A Magnetoresistive Readout Transducer", *IEEE Transactions on Magnetics.* vol. MAG–7, No. 1, Mar. 1971, pp. 150–154.

METHOD OF FORMING ANTISLIP SURFACES ON THERMOFORMED PRODUCTS

CROSS-REFERENCE TO RELATED APPLICATION

This application is a U.S. National Phase application under 35 USC §371 of PCT International Application PCT/US95/09193 which was filed on Jul. 19, 1995, and a continuing application claiming the benefit under 35 U.S.C. §120 of prior copending U.S. application Ser. No. 08/282,219, filed on Jul. 28, 1994 and issued as U.S. Pat. No. 5,648,031 on Jul. 15, 1997.

FIELD OF INVENTION

This invention relates to a method for imparting antislip properties to thermoformed plastic surfaces and products. The invention is particularly useful for increasing the friction on load bearing and cargo carrying surfaces such as those of thermoformed pickup truck bed liners. The invention selectively increases frictional effect primarily through enhanced three dimensional macroscopic surface relief and roughness so that it is effective even when the surface is wet. Composition of the surface is also a factor contributing to the increased friction. The invention is useful for a variety of other practical and industrial applications as well as for games and recreational products. The invention provides a hard and tough antislip surface preferably with an elastomeric component and with a hardness that is not brittle or sharp. It is suitable, for example, for bare feet applications such as swimming pool surfaces, showers, bathtubs, walks, and stairs.

BACKGROUND INFORMATION

Essentially all truck bed liners are thermoformed from high density polyethylene (HDPE) sheets. Other materials such as ABS, synthetic rubber plastic, and other thermoplastic polymers are sometimes used. The thermoplastic sheets are heated to a thermoforming temperature in a thermoforming oven and are deformed by ambient air pressure after application of vacuum on one side in a thermoforming mold to produce the desired product. Many other products are also manufactured by this process. A disadvantage of the HDPE material however is its low coefficient of friction. HDPE surfaces become even more slippery when wet.

U.S. Pat. No. 4,693,507 (Dresen et al.) describes a truck bed liner with antislip surface properties. Increased coefficient of friction on the liner surface is achieved by applying a continuous film or layer of elastomeric material over the HDPE sheet. The thickness of the integral elastomeric layer or film is typically in the range of 25 mils–30 mils (625$\mu$–750$\mu$). The elastomeric film is preferably coextruded over the HDPE sheet which is typically 180 mils–250 mils (4.5 mm–6.2 mm) in thickness. However, Dresen et al. state that the elastomeric film layer can alternatively be applied to the HDPE sheet by lamination, by adhesive, or by heat application.

An increased frictional force is therefore achieved primarily by the "plowing effect" or embedding effect of harder cargo pieces pressing into the softer continuous elastomer layer. A disadvantage of the Dresen et al. scheme however, is that the frictional force attributable to the integral elastomeric layer is reduced when the elastomer film is wet. Another disadvantage of the Dresen et al. method is the increase in cost of adding and applying the integral and continuous layer of elastomeric material by coextrusion, lamination, adhesion, or heat application. The elastomer film of Dresen et al. generally extends across the entire substrate plastic sheet.

OBJECTS OF INVENTION

It is therefore an object of the present invention to provide a new method of imparting antislip properties to thermoformed plastic surfaces, which increases frictional forces and the coefficient of friction for wet as well as dry surfaces. An advantage of the invention is that it imparts a practical coefficient of friction substantially twice that of the closest prior art antislip surface for both wet and dry surfaces.

Another object of the invention is to increase the practical coefficient of friction and frictional force on thermoformed plastic surfaces by means of increased three dimensional macroscopic surface relief, asperities, and roughness. This is to be accomplished with hard and tough materials preferably with viscoelastic or elastomeric properties and with a hardness that is not brittle or sharp. The new antislip surface imparted by the invention is suitable for bare feet and can be applied in both dry and wet environments such as swimming pools and swimming pool areas, bathtubs, showers, and bathrooms.

A further object of the invention is to impart antislip properties and increase the coefficient of friction on thermoformed plastic surfaces by the composition of the surface with reduced materials and expense and without the cost of handling and applying continuous or integral film layers on a substrate plastic surface. Furthermore, the antislip surface can easily be applied very selectively to only portions of the thermoformed plastic surface in any shape or configuration while leaving other areas untreated.

SUMMARY OF THE INVENTION

In order to accomplish these objects, the invention provides a new process for selectively forming an antislip surface on a product thermoformed from a plastic sheet. The plastic sheet may be formed of any suitable thermoplastic polymer material such as polyethylene (e.g. HDPE), ABS, synthetic rubber, polypropylene, and other polyolefin thermoplastic polymers, for example. Typically the method proceeds by cleaning the surface of the plastic sheet for removing oils and other contaminants and preparing a good bonding surface. Next, the plastic sheet is masked for exposing selected surface areas to be treated with the antislip surface and covering other areas not to be treated. In some applications the cleaning and masking steps are not required.

One embodiment of the invention includes atomizing into droplets a sprayable polymer, preferably a thermosetting elastomeric polymer or other polymer having a viscoelastic or elastomeric component and a relatively rapid reaction time. Other polymers which harden to a hard tough plastic material without brittleness or sharpness can also be used as hereafter described. The invention proceeds by flash spraying a mist of the atomized droplets onto the masked plastic sheet, or otherwise forming and applying the droplets to the selected exposed area of the plastic sheet, so that the droplets form a stippled pattern of primarily separate bumps or pimples across the treated surface area. The method also includes controlling the time duration of the flash spraying or otherwise controlling the application of droplets so that the droplets preferably cover or occupy substantially less than 50% of the treated surface area leaving the underlying plastic sheet substantially exposed between the droplets.

By reason of the masking step, the stippled pattern of primarily separate droplets or pimples can be selectively applied over only a portion of the HDPE sheet in any desired shape or area configuration. The treated surface area can thereby, for example, be limited to a cargo carrying surface or only a portion of the cargo carrying surface. By way of example, only a fraction of the cargo carrying surface, such as one half of the surface, can be treated for a higher coefficient of friction while the other half remains as an HDPE surface with lower coefficient of friction. Thus the right half of the truck bed liner surface may be treated to provide an antislip surface for cargo containers while the left half permits sliding of the objects for loading and unloading. As a further alternative, the pattern of droplets need not be selectively applied and the masking step can be eliminated. For example, the entire HDPE sheet can be treated to impart antislip properties over all the surfaces of the truck bed liner or other thermoformed product.

As a next step of the invention, the droplets forming the stippled pattern are at least partially hardened and solidified in an initial drying step. The plastic sheet is then thermoformed according to standard thermoforming procedures at thermoforming temperatures to produce the product. The thermoforming process causes intimate bonding of the droplets to the plastic sheet and relative hardening of the droplets to form three dimensional macroscopic asperities having an enhanced relief and surface roughness, causing a relatively higher coefficient of friction over the treated surface area. These macroscopic asperities of the antislip surface engage the peaks, valleys and surface relief of objects placed on the antislip surface by interlocking of asperities and macroscopic roughness on the two surfaces. As a result, the coefficient of friction and frictional force is substantially increased to a value that is substantially maintained when the surfaces are wet. The enhanced surface roughness and macroscopic asperities are achieved by several coating effects of the interacting process steps.

First it has been found that the thermoforming temperatures cause an intimate physical or chemical bond between the thermosetting elastomeric polymer droplets and the plastic sheet typically composed of high density polyethylene. The bonding between the droplets and the HDPE sheet is apparently as strong as the bonding of polyethylene to itself, and the droplets cannot be scraped off without cutting through the bonded materials. This bonding between the droplets and the HDPE sheet is enhanced by mixing with the thermosetting elastomer a small amount of an adhesion promoter which bonds or cross links both to the thermosetting elastomer and to the HDPE sheet.

Second it appears that the thermoforming temperatures cause a relative hardening and post cure thermosetting of the thermoset elastomeric polymer that was sprayed in droplet form and initially hardened and cured on the exposed surface areas of the plastic sheet. While the thermosetting elastomer retains some elastomeric properties, there is a hardening relative to its properties prior to heat curing. The increased coefficient of friction and frictional force effect is therefore achieved primarily not by elastomeric properties but by the relative hardness of the droplets forming macroscopic asperities across the treated surface area. Other sprayable or liquid polymers that are formable into droplets and hardened by the thermoforming process can also be used as hereafter described.

Third, the projecting islands, pimples, or projections formed by the droplets bonded and hardened across the treated surface area are enhanced in relief by an effect referred to by the inventor as the "moth effect". Thermoforming heat is generally applied to both sides of the plastic sheet by a variety of heater arrangements such as, for example, infra-red radiant heaters, which may comprise catalytic gas burners as an example. Electrical heating elements with blowers are also typically used. The inventors have noted that if a moth falls on the plastic sheet prior to or during heating, then a corresponding moth-shaped plateau rising slightly above the surrounding area will be formed at the location of the moth during thermoforming of the sheet. It is believed this effect is due to "shading" or "screening" provided by the moth. The shading produces a temperature differential so that higher temperature areas surrounding the shaded outline of the moth are subject to differential thermoforming and thinning, and thus are more greatly vacuum formed and pulled away from the shaded area. This causes a slightly differential thickness or surface relief according to the pattern of differential temperatures.

Similarly it is observed that the droplets forming a stippled pattern across the treated surface area shade or screen the particular spots under the droplets from the heat sources used to bring the plastic sheet to thermoforming temperatures. The stippled pattern of droplets produces a corresponding stippled pattern of shading and differential temperatures. Furthermore, the droplet material mechanically reinforces the plastic sheet to resist vacuum forming at the locations under the droplets. During thermoforming the areas of the plastic sheet surrounding the droplets are vacuum pulled to a lesser thickness than the shaded areas under the droplets. This effect enhances the relief, projection and elevation of the macroscopic asperities, and the roughness across the treated surface area. For example, it has been observed that the height of the asperities on a finished thermoformed product can be nearly double the height of the droplet projections on a sheet before thermoforming.

Finally, some of the droplets atomized from the viscous thermosetting elastomeric polymer entrap air. The entrapped air may explode through the top of the droplet during thermoforming thereby forming rough edges on the droplets to increase the coefficient of friction. The increased roughness is achieved on the hard, tough pimples without brittleness or sharpness.

In the preferred example embodiment the process includes cleaning the surface of the plastic sheet by flame treatment for burning off contaminants and preparing a good bonding surface, applying the droplets, at least partially hardening and solidifying the droplets and thermoforming the HDPE sheet to form the final product in the thermoforming temperature range of 250° F.–550° F. (121° C.–288° C.) and preferably in the range of 370° F.–400° F. (188° C.–204° C.). The step of initially drying or hardening and solidifying the droplets before thermoforming can be accelerated by heating. The time duration of the flash spraying may be controlled to an interval down to a fraction of a second, for example, through a spray head at a relatively high pressure, for example in the range of 1,000–2,000 psi (70–140 bar). Even when the spray duration is longer, e.g. about one second, it should be precisely controlled within a fraction of a second. Typically the flash spraying is from a spray head at a distance from the HDPE sheet in the range of 2.5'–4.5' (0.75 m–1.35 m).

According to the preferred examples, the atomizable sprayable polymer is selected to form hard and tough pimples durably bonded over the selected antislip surface after thermoforming. The droplets are not brittle or sharp. A variety of starting polymers can be used for the sprayable polymer designed to achieve the desired characteristics of hardness, toughness, and strong bonding and without impact brittleness or sharpness. The sprayable polymer is preferably a thermosetting elastomeric polymer such as, for example, polyurea prepolymers and polymers, hybrid prepolymers and polymers such as hybrid polyurea polyurethane polymers in which the polyurea bonds predominate, and other polyether resins generally including epoxy resins, for example. High temperature tolerant thermoplastics such as polyester resins are also suitable.

It is noted that both thermosetting polymers and thermoplastic polymers as well as combinations thereof can be used for the sprayable polymer. The polymer or polymer mixture is selected to provide toughness and a hardness of the asperities that is preferably greater than the hardness of the underlying thermoplastic sheet but below brittleness and sharpness. Alternatively, the asperities can have the same or a lower hardness than the sheet, but the abrasion resistance may then be undesirably reduced.

Thermoplastic polymers suitable for the droplets, such as styrene, are made sprayable by mixing with a suitable solvent. The droplets are initially dried and hardened by evaporating the solvent. Alternatively, lower viscosity thermoplastics can be made mistable or sprayable by heating the bulk polymer material to a suitable temperature at which droplets can be formed. Initial drying and hardening is achieved by lowering the temperature to a suitable hardening temperature. For the thermosetting resins, sprayability is achieved as described above by mixing and spraying the reacting components. Initial drying and hardening is achieved by the reaction of the components. It is also noted that the selection of the sprayable polymer or polymer mixture increases the friction on the stippled surface not only by the surface profile of hard macroscopic asperities but also by the composition of the surface material. For example the polyurea polymer asperities, as well as asperities of other thermoset and thermoplastic polymers, provide greater interaction with any object passing over the surfaces than does the HDPE surface of the underlying sheet.

The polymer droplets can be formed and applied on the selected surface area by methods other than misting and spraying. For example, the droplets can be formed and applied by a roller containing the polymer in sprayable or liquid form and having pin holes or ejector holes through which droplets are dispensed as the roller passes or turns over the selected surface area. The pin holes or ejector holes can be arranged with the appropriate density for dispensing droplets on preferably less than 50% of the surface area. Alternatively the substrate sheet can pass under a droplet dispenser having a reservoir of the polymer in sprayable or liquid form. The reservoir is formed e.g. with one or more rows of pinholes for forming and dispensing droplets on the selected surface area in the desired density covering less than 50% of the surface area.

As used in the specification and claims, the adjective "sprayable" does not necessarily imply that the polymer is sprayed but rather that the polymer is prepared in a sprayable condition, such as a liquid form, capable of formation into droplets. The sprayable polymer may then be formed into droplets and dispensed by misting and spraying or by "dripping" or being applied onto the selected surface area by a roller or reservoir dispenser or any other droplet applying means.

Appropriate additives and agents may be required to achieve the desired characteristics. An adhesion promoter can be added to the thermosetting elastomeric polymer, thermoplastic polymer, or polymer mixture, in the range of for example 1%–7% by weight and preferably about 5% by weight of the mixture. A suitable adhesion promoter is for example a cross linking melamine resin.

The preferred size range of droplets of the viscous thermosetting elastomeric polymer, thermoplastic polymer, or polymer mixture is 2 mils–30 mils ($50\mu$–$750\mu$) in diameter. Larger size droplets can also be used. After thermoforming, the bumps or pimples forming the stippled pattern across the treated surface area are also substantially in the size range of 2 mils–30 mils ($50\mu$–$750\mu$) although larger size bumps are also suitable.

The invention is applied to thermoforming truck bed liners from an HDPE or other thermoplastic sheet. The plastic sheet is masked to expose a portion of the cargo carrying surface of the truck bed liner for treatment with an antislip surface. Other applications for the invention include slip sheets, pallets, and other industrial, domestic and commercial applications as well as games and recreational products such as "slide bars" and ski devices. In the case of slip sheets and other substantially flat surface products, thermoforming can take place in a mold with a shallow basin well. An undersize sheet can be used so that the flat surface product portion is pulled into the shallow basin to achieve the differential thinning effect with enhanced asperities. Such thermoforming achieves the enhanced and increased three dimensional relief provided by the macroscopic droplet asperities rising above the surrounding surface of the vacuum thinned plastic sheet. The thermoforming also completes a secure bonding between the droplets and the HDPE substrate and causes a relative hardening of the thermoset polymer droplets.

Other objects, features and advantages of the invention are apparent in the following detailed description and accompanying drawings.

BRIEF DESCRIPTION OF THE DRAWINGS

FIG. 6A is a detailed diagrammatic side view of the HDPE sheet mounted in a frame for sliding into the thermoforming oven, while

Figure 1:
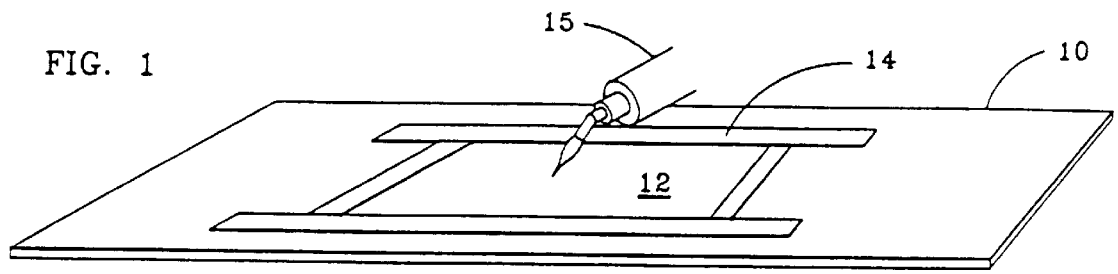
FIG. 1 is a diagrammatic perspective view of a flame cleaning step for cleaning the area of an HDPE sheet to be treated and formed with an antislip surface according to the invention.

DETAILED DESCRIPTION OF PREFERRED EXAMPLE EMBODIMENTS AND OF THE BEST MODE OF THE INVENTION

The process for forming antislip surfaces on thermoformed products according to the invention is illustrated in the example of FIGS. 1–7. In this example an HDPE sheet 10 is to be thermoformed into a pickup truck bed liner 60, of which the cargo carrying surface 12, 62 is to be prepared according to the invention with an antislip surface. Other thermoplastic polymer plastic sheets can also be used. The HDPE sheet is typically in the size range of approximately 5'×10' (1.5 m×3.0 m) with a thickness typically in the range of 180 mils–250 mils (4.5 mm–6.2 mm). The surface portion 12 of the HDPE sheet 10 which will become the bottom surface or cargo carrying base of the bed liner and specifically the portion between the wheel wells is delineated by tape 14 such as duct tape or masking tape. Any other suitable procedure for marking and indicating the area that will become the cargo carrying portion 12 of HDPE sheet 10 can also be used.

As shown in FIG. 1, the portion 12 of HDPE sheet 10 to be treated is first cleaned to remove grease, oil, and other surface contaminants. This is preferably accomplished by briefly flame treating the surface portion 12 with a torch flame 15 for burning off surface contaminants without disfiguring the surface. This is accomplished in several minutes or less. Corona treatment and chemical cleaning can also be used. Flame treatment is preferred because it prepares a good bonding surface on the polyethylene plastic material. It has been found that the flame treatment exposes active molecular bonding sites for durable, secure bonding between the applied droplets and the thermoplastic sheet. Flame treatment and oxidation apparently leave polar ends on the plastic material surface for enhanced bonding of the sprayable polymer droplets.

It is not known whether the bonding is predominantly mechanical, physical, chemical, or all three, but intimate physical molecular bonding is likely an important factor. Mechanical bonding may also be an important factor to the extent that the droplets in a liquid or plastic state seep into pores and irregularities of the HDPE sheet surface, whereby mechanical interlocking also contributes to the bonding.

A flame treatment apparatus has been devised with a line of flame long enough to extend across the surface area to be flame treated. The line flame is mounted in fixed position over a table that is mounted on rollers or tracks. The sheet of thermoplastic material is placed on the table and the table is translated by rolling under the line flame for flame treatment of the selected surface area of the plastic sheet. It has been found that flame treatment for a longer time produces a better bonding surface. For example, the cargo carrying surface portion passes under the line flame in a time range of 7–21 seconds and preferably a longer time period, e.g. about 21 seconds for preparing a good bonding surface. The duration of the flame treatment is limited to avoid any significant temporary warpage due to the heating of one side of the thermoplastic sheet.

Figure 2:
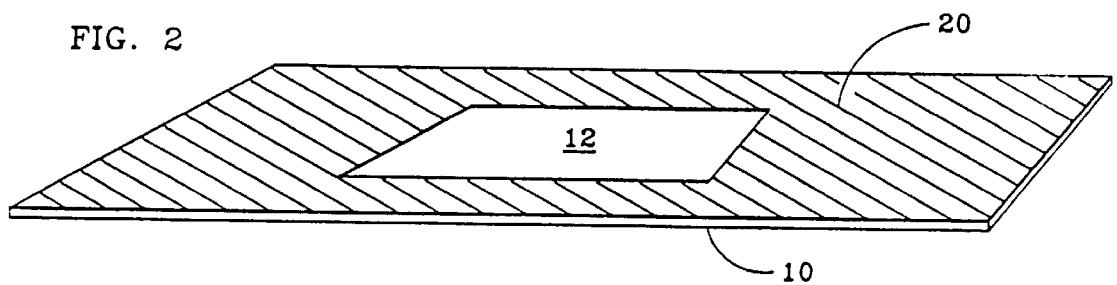
FIG. 2 is a diagrammatic perspective view of the masking step for selectively masking the HDPE sheet and exposing the surface area to be treated.

After cleaning the selected surface area portion 12, the HDPE sheet 10 is masked with a suitable masking material such as kraft paper. The mask 20 exposes the selected surface area 12 on which an antislip surface is to be formed, and covers the other surface areas of HDPE sheet 10 which are not to be treated, as shown in FIG. 2.

Figure 3:
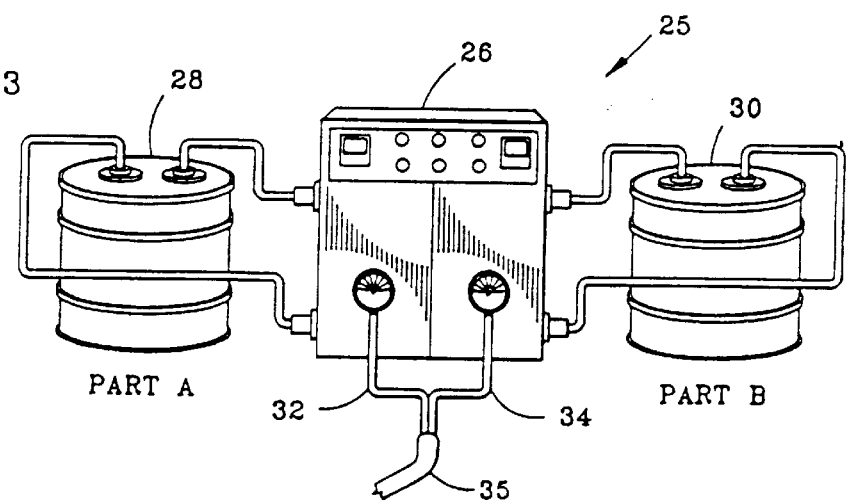
FIG. 3 is a diagrammatic side elevation view of the proportioning unit for mixing, atomizing into droplets, and spraying or misting the thermosetting elastomeric polymer.
Figure 4:
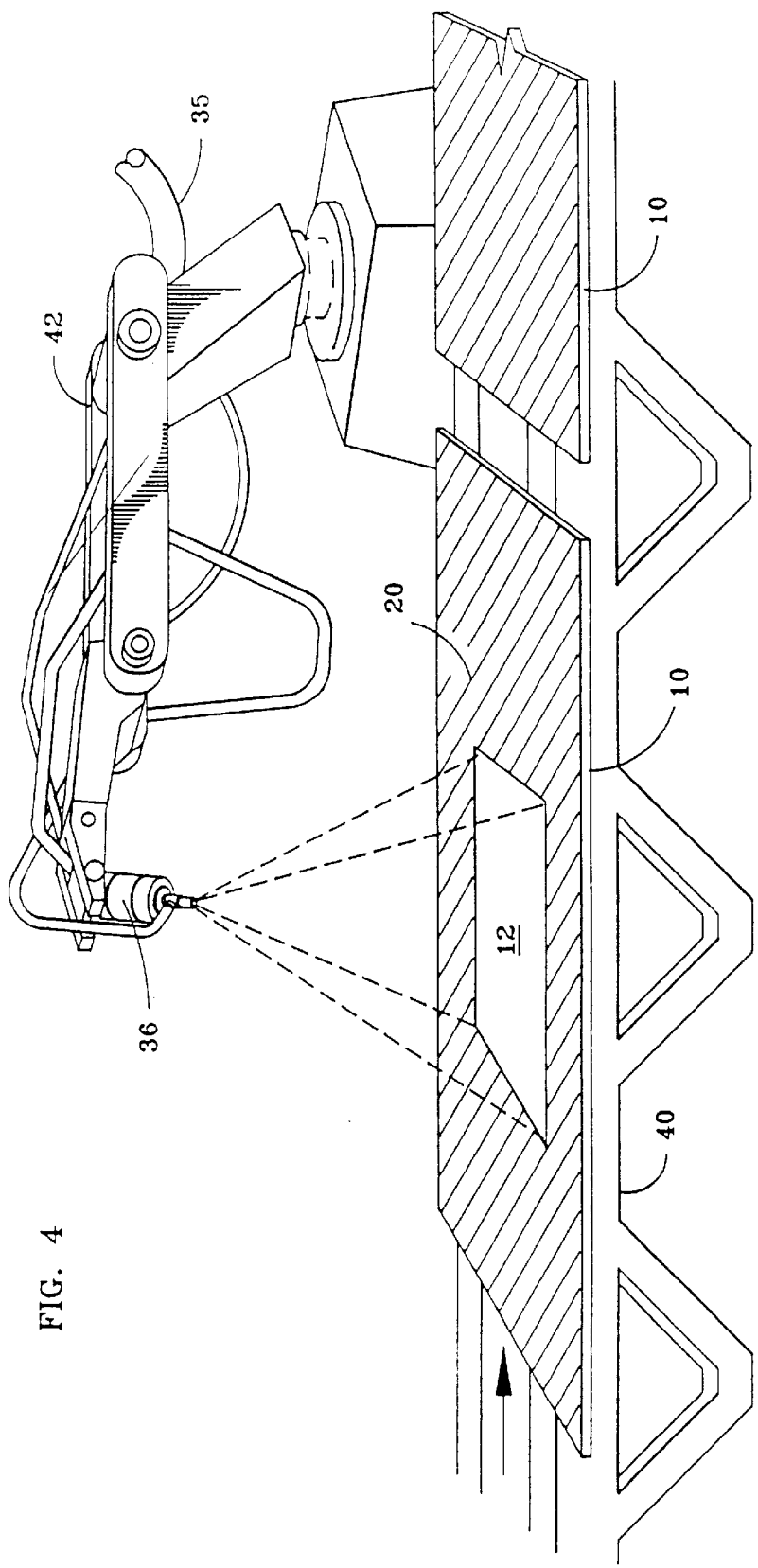
FIG. 4 is a side perspective view of the step of spraying or misting the atomized droplets of thermosetting elastomeric polymer onto the exposed surface area to be treated.

A suitable thermoset elastomer polymer is prepared for spray application on the selected surface 12 as shown in FIGS. 3 and 4. The mixing, atomization, and spraying of the polymer is accomplished using a standard polyurethane spray system 25 such as a Gusmer spray system available from the Gusmer Corporation of Lakewood, N.J., as a "Proportioning Unit" sold under Gusmer Model No. VH-3000. An adjustable automated pump and proportioning unit 26 mixes Part A and Part B chemical reactants stored in barrels 28, 30 in the desired proportions or ratio. The reactant chemicals are delivered separately through lines 32, 34 joined in a single sheath 35 to the spray head 36 shown in FIG. 4. The spray head mixes, atomizes and sprays droplets of the resultant thermosetting elastomeric polymer as hereafter described.

A suitable thermoset elastomer for use in the process is a polyurea polymer derived from the reaction of a Part B polyurea prepolymer and a Part A isocyanate such as a diisocyanate. The polyurea prepolymer differs from the more conventional polyurethane prepolymer. It is an amine terminated polyether rather than a hydroxyl terminated polyether or polyol. The NCO groups of the isocyanate react preferentially and more quickly with amine terminated polyethers. The amine terminated polyethers will also displace the hydroxyl terminated polyethers. The resulting polyurea bond is tougher than the polyurethane bond and withstands higher temperatures without breakdown or degradation.

A suitable polyurea prepolymer for use as Part B is sold under the trademark Jeffamine™ by Huntsman Corporation of Austin, Tex. The Jeffamine™ polyurea prepolymer is an amine terminated aliphatic polyether with both diamine and triamine terminations. The diamine terminations retain flexibility in the reacted polymer while the triamine terminations promote cross linking for increased stiffness. The proportions of diamine and triamine can be adjusted according to the particular application. An adhesion promoter of Melamine monomer resin is mixed with the Jeffamine™ polyurea prepolymer in an amount preferably equal to approximately 5% by weight of the mixture. The Melamine monomer is advantageous because it bonds to both the polyurea prepolymer and the HDPE substrate. The cross linking Melamine resin therefore promotes bonding between the reacted polyurea polymer and the HDPE sheet substrate. Other adhesion promoters can also be used and the concentration of adhesion promoter can be varied over a range e.g. from 1%–7% by weight.

A premixed Jeffamine™ type polyurea prepolymer and cross linking Melamine resin adhesion promoter can be obtained in proper premixed proportions from Enichem America, Inc., 1448 VFW Drive, Conyers, Ga. 30207, under the Enichem product code EC856M.

Part A is an isocyanate with NCO groups for reacting with the amine terminations of the polyurea. A particular isocyanate suitable for reaction with the modified polyurea prepolymer is diphenylmethane-4 4'diisocyanate. This diisocyanate is sold under the Enichem product code EC856MFLX21. Other isocyanates and diisocyanates can of course be used for Part A. Two mixed ratios of Parts A:B recommended by Enichem America, Inc. are 0.47 and 1.0. However, the ratio may be selected in a typical ratio range of Parts A to B of e.g. 0.4–4.0. Within this range, the resulting polyurea isocyanate polymer after thermoforming may have a flex modulus or stiffness in the range of 10,000–80,000 psi and durometer or hardness in the range from 40A to 60D.

A feature of the modified polyurea prepolymer is that it also incorporates a small percentage, for example in the range of 5%–7% by weight, of polyurethane type hydroxyl terminations or bonds in the isocyanate. This small percentage of polyurethane terminations assists with initiation of the reaction between the polyurea and isocyanate. Once the reaction is initiated the polyurea bonds between the amine terminations and NCO groups react with greater speed and the NCO groups of the isocyanate preferentially react with the amine terminations. The polyurea/isocyanate reaction can take place for example in the range of several seconds to 30 seconds for a fast reaction time.

Figure 5:
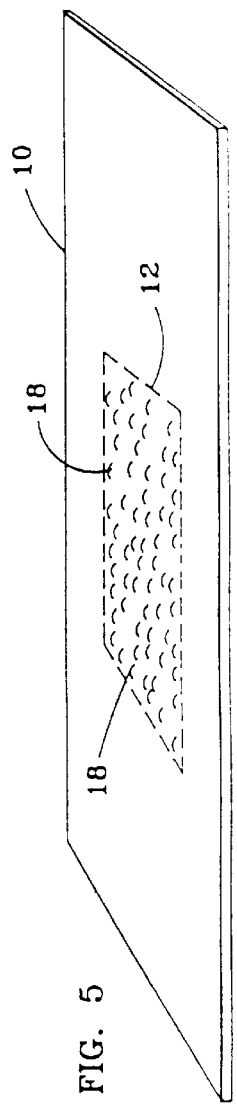
FIG. 5 is a diagrammatic perspective view of the HDPE sheet with a treated surface area in preparation for thermoforming.

For controlling the speed of the reaction, blockers can be added to the reacting mixture to slow the reaction time and allow the mist of droplets to settle on the exposed selected surface area for good bonding to the plastic sheet. By way of example, a blocking agent or slowing agent can be substituted on some terminations to slow the reaction time to the range of e.g. 20 seconds to a minute or more.

In the preferred example, however, the process time and droplet size are controlled by the temperature of the reaction rather than by blocking agents. The proportioning unit 26 incorporates heaters for heating the reactants. Lines 32, 34 in sheath 35 may also incorporate a line heater. According to the process, the reactants are typically heated in the range of 168° F.–185° F. (76° C.–85° C.) for atomization and spray or mist application. It has been found preferable to regulate the temperature of reactants to the lower end of this range, e.g. down to 168° F. (76° C.). At this lower temperature, the reactants are more viscous and form larger droplets of more consistent size at the larger end of the size range of 2 mils–30 mils (50$\mu$–750$\mu$). The larger droplets have been found preferable in providing better bonding of the separate droplets to the surface of the polyethylene or other thermoplastic sheet. At the lower temperature range the consistently larger droplets also settle on the plastic sheet before the polyurea/isocyanate reaction is complete, further enhancing bonding with the plastic sheet.

Other atomizable and sprayable polymers may be used for preparing an antislip surface, including selected polymers and polymer mixtures and combinations capable of spray-on or mist application. The plastic polymer may be either thermosetting or thermoplastic or both, but should be selected to achieve the following characteristics. The sprayable polymer or polymer mixture should be relatively fast reacting and provide durable bonding to the thermoplastic sheet substrate. It should form separate droplets or pimples which are hard and tough after thermoforming but not brittle and sharp. A variety of sprayable resins and polymers and resin and polymer mixtures, thermosetting resins, thermosetting elastomeric resins, and thermoplastic polymers can achieve these characteristics. It will be apparent to polymer chemists skilled in this field that numerous polymer combinations and formulas can be selected, i.e. designed to achieve the desirable characteristics.

While the preferred thermosetting elastomer polymer is the polyurea polymer, hybrid polyurea polyurethane polymers can also be used as long as the polyurea bonds and the polyurea polymer predominate over the polyurethane. As further described below, the polyurea bonds respond favorably to the thermoforming process enhancing the desirable characteristics of the polyurea polymer. On the other hand the polyurethane bonds may be adversely affected by the thermoforming heat, causing breakdown of the bonds. The polyurea bonds should therefore predominate over the polyurethane bonds. Other thermosetting polyether resins, such as epoxy resins amenable to spray-on application, can also be used. Certain thermoplastic polymers such as polyester polymers and mixtures and other coating polymer combinations capable of withstanding the high thermoforming temperatures may also be designed for the process.

An advantage of the above-described particular example thermosetting elastomeric polymer is that its favorable characteristics are enhanced by the thermoforming process and the high temperatures of the thermoforming oven. Specifically the adhesion promoter as well as the polyurea itself form durable bonds with the high density polyethylene molecules on the surface of the HDPE sheet. These bonds are as durable as the polyethylene itself and the droplets cannot be removed from the thermoformed sheet without cutting the droplets. On the other hand prior to thermoforming, the droplets sprayed on the exposed area 12 of the HDPE sheet 10, after a suitable initial hardening or drying time, can still be removed by abrasion. Furthermore, the thermoforming process hardens the droplets to form asperities which give a high coefficient of friction over the treated surface area.

The thermoset polymer, thermoplastic polymer, or combination thereof is selected to have a hardness in the finished product preferably greater than the underlying thermoplastic sheet but less than a brittle and sharp hardness. For example the hardness may be in the durometer range from 40A to 60D within these constraints. The sprayable polymer with such a hardness is suitable for barefoot walking surfaces such as swimming pool surfaces etc.

The thermosetting, thermoplastic or combination polymer in liquid sprayable condition is formed into droplets and applied to the selected area to be provided with an antislip surface by misting or spraying in the present preferred example. Alternatively, as explained above, the droplets can be formed and applied by rolling or dripping through pin hole dispensers. As shown in FIG. 4 Parts A and B are mixed at the spray head 36, atomized, and applied as a spray mist to the exposed cargo loading area 12 of HDPE sheet 10. The HDPE sheets 10 may be handled on a conveyor 40 while the sprayer is aligned overhead by robotic arm 42. The spray head 36 is typically arranged to be approximately 2.5' to 4.5' (0.75 m–1.35 m) over the HDPE sheet 10. The spray head 36 is controlled to deliver a fine mist of droplets for a spray period that may last only a fraction of a second or about a second, applying droplets of reacting polyurea polymer on the exposed surface area 12. The reaction time of Parts A and B may last from a few seconds to a few minutes according to the reactants. For slower reactions, the reaction time is preferably in the range of 20 seconds to a minute and for faster reactions 3–30 seconds. The reaction of the polyurea prepolymer and isocyanate is an exothermic reaction generating a spray temperature from exothermic heat alone in the range of for example 150° F. to 160° F. (66° C.–71° C.). With the exothermic heat and air drying and curing, the droplets 18 at least partially harden on the selective surface 12 in preparation for the thermoforming step. Drying can be accelerated by application of supplemental heat.

As shown in FIG. 5 the droplets 18 from the mist settle across the exposed surface area 12 with preliminary bonding to the HDPE plastic material. The temperature and spray duration from spray head 36 are controlled so that droplets in the size range of for example 2 mils–30 mils (50$\mu$–750$\mu$) are applied to the exposed surface area 12, preferably covering less than 50% of the surface area and leaving HDPE exposed between the droplets 18. The droplet size shown in FIG. 5 is exaggerated. The droplet coverage can also exceed 50%, but it has been found that low density coverage is as effective or even more effective than high density coverage. In the preferred embodiments, the droplets are therefore adjusted to cover substantially less than 50% of the exposed surface area, such as less than 25% or even less than 15% of the area.

An advantage of the masking step according to the process is that the area to be treated can be any surface area in any desired shape or configuration. The process is not limited to any particular orientation or direction. If only a portion of the cargo area is to be treated with antislip properties, this can be readily accomplished at the masking step.

Figure 6:
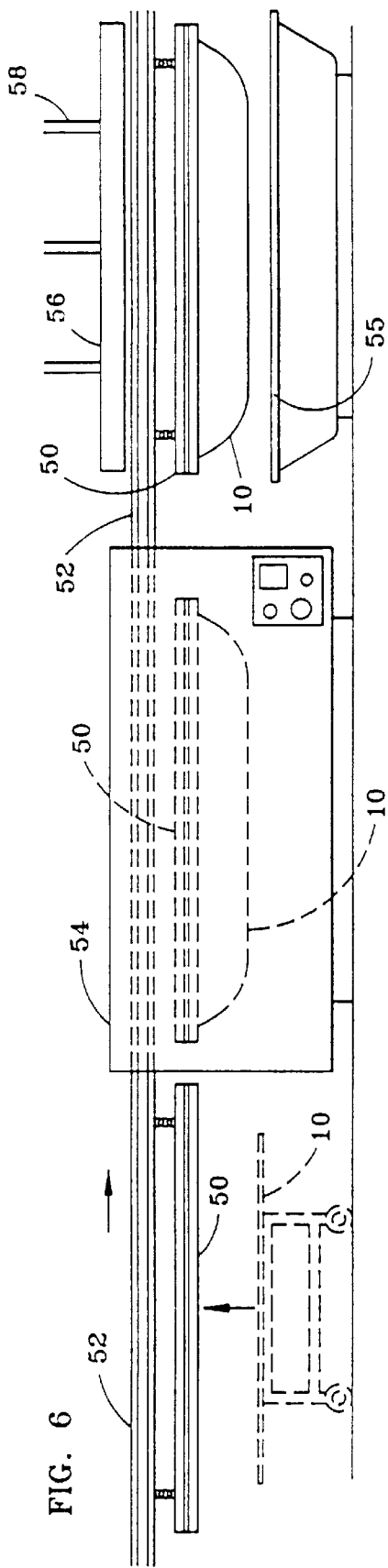
FIG. 6 is a diagrammatic side view of the thermoforming process for heating the specially prepared HDPE sheet in preparation for vacuum forming in a vacuum mold.

In FIG. 5 the mask has been removed and the HDPE sheet 10 is ready for thermoforming. As shown in FIG. 6 and especially the detailed illustration of FIG. 6A, the HDPE sheet 10 with the specially prepared surface portion 12 is mounted in the frame 50 with the frame supporting the HDPE sheet 10 at its edges. The frame 50 is suspended from a track 52 for sliding into the thermoforming oven or furnace 54. Inside the thermoforming oven 54 the HDPE sheet is heated to temperatures typically in the range of 370° F.–400° F. (188° C.–204° C.) although a broader temperature range of 250° F.–550° F. (121° C.–288° C.) is applicable. The HDPE sheet 10 is typically heated on both sides by infrared radiant heaters over a period of, for example, three to four minutes until the sheet 10 is uniformly heated to the thermoforming temperature range and sags downward from the frame 50.

The suitably heated and softened HDPE sheet 10 sagging from frame 50 is then delivered along the track 52 outside the oven over a thermoforming or vacuum forming mold 55. The mold 55 has suitable perforations or holes for application and distribution of vacuum across the sagging HDPE sheet 10.

Figure 6B:
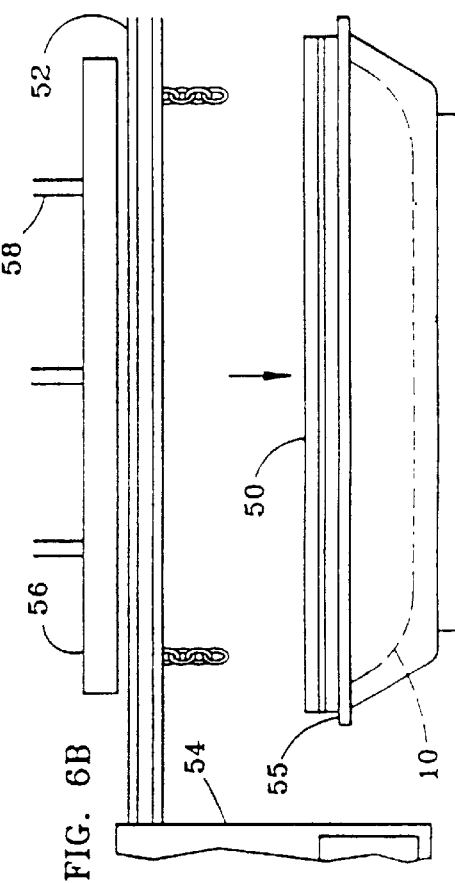
FIG. 6B is a diagrammatic side view of the heated and sagging or depending HDPE sheet sitting in the vacuum forming mold.
Figure 6A:
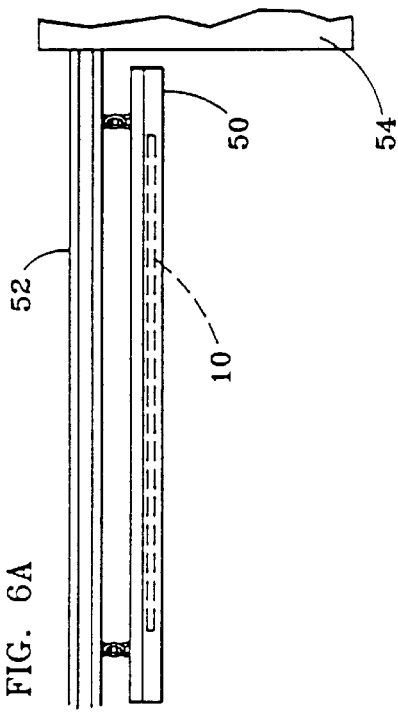
Figure 7:
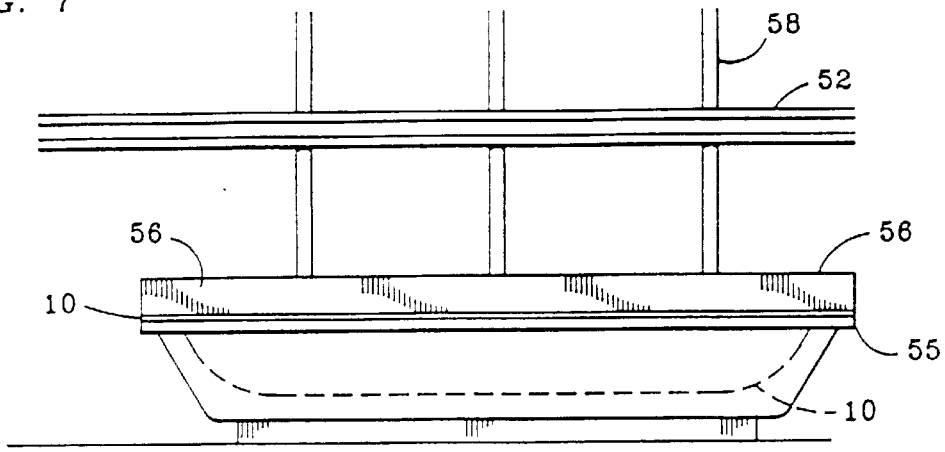
FIG. 7 is a detailed side view of the retention framework holding the HDPE sheet in position during the vacuum forming process in the vacuum mold.

As shown in detail in FIG. 6B, the frame 50 supporting the depending or sagging HDPE sheet 10 is lowered so that the frame 50 rests on top of the mold 55 and the sagging HDPE sheet 10 is distributed near the vacuum forming surfaces of the mold 55. Next, the frame 50 is disassembled at the corners and removed over the sides of the mold 55. Then, as shown in FIG. 7, the retaining framework 56 is lowered on plungers 58 to engage and press the edges of the HDPE sheet 10 against the top rim of the mold 55 to hold the depending HDPE sheet 10 in place during the thermoforming process. Vacuum is then applied allowing atmospheric pressure to push the HDPE sheet 10 against the molding surfaces of the mold 55 to produce the truck bed liner 60 illustrated for example in FIG. 8.

Figure 8:
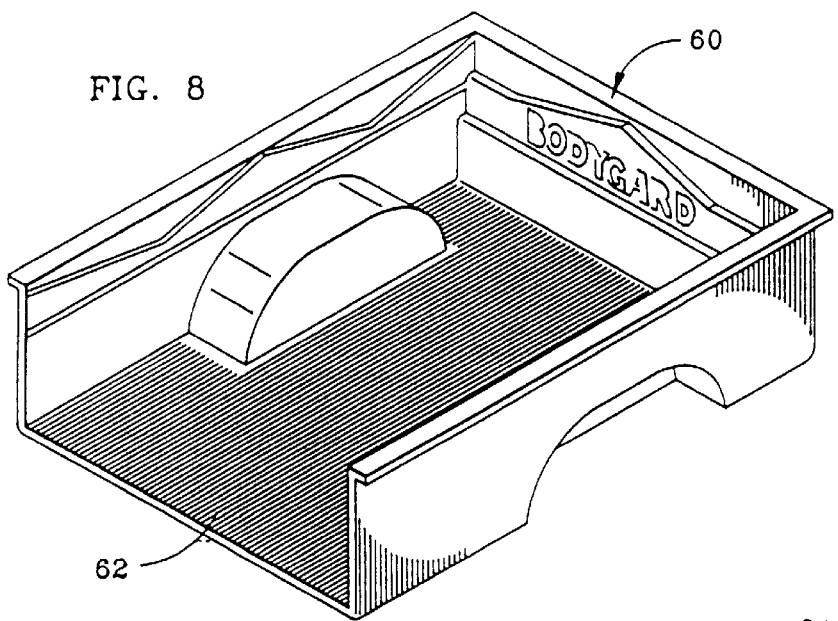
FIG. 8 is a diagrammatic perspective view of a pickup truck bed liner thermoformed according to the process of the invention with an antislip cargo carrying surface between the wheel wells.
Figure 9:
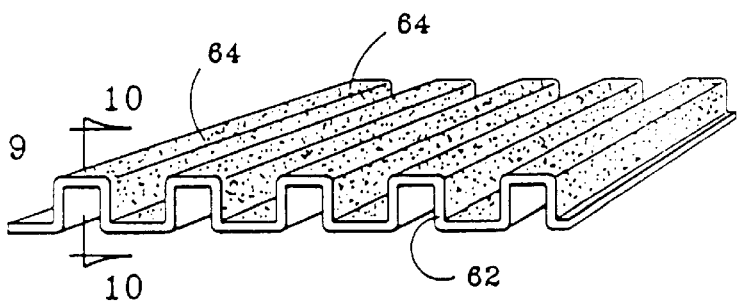
FIG. 9 is a detailed fragmentary perspective view of a portion of the antislip base of the bed liner.

The truck bed liner 60 shown in FIG. 8 has been trimmed after removal from the mold, cutting away excess plastic from the HDPE sheet and cutting away the tailgate liner portion (not shown) to be mounted on the tailgate of a pickup truck. The bed liner 60 is formed with a bottom portion or base 62. The area of base 62 between the wheel wells coincides with the exposed surface area 12 of HDPE sheet 10 exposed by the mask 20. An antislip surface has therefore been formed across the base 62 of the bed liner 60 between the wheel wells. The difference in appearance between the untreated HDPE and antislip surfaces is not visible from the distant vantage point of FIG. 8. A portion of the base 62 between the wheel wells is shown in detail in FIG. 9 where the droplets 64 are visible forming a stippled pattern across the base 62. The droplets 64 preferably cover less than 50% of the surface area across the base 62 leaving exposed areas of the HDPE sheet between droplets. In this manner, the droplets 64 form substantially separated, non-connected and discontinuous asperities, bumps or pimples without forming a continuous or contiguous layer, film or mat of droplets. In other words, most or substantially all of the bumps do not contact other bumps. Even when some droplets overlap or contact each other, the overall result is one of non-contiguous bumps or asperities.

Figure 10:
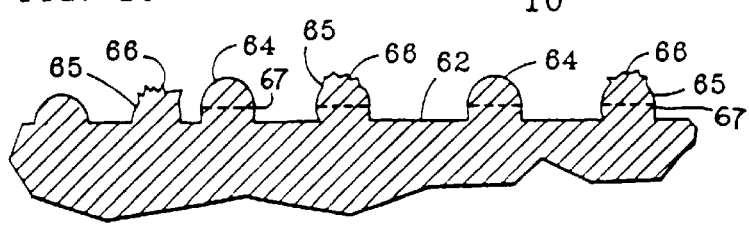
FIG. 10 is a diagrammatic cross sectional side view in the direction of arrows 10 of FIG. 9 showing the characteristics of the thermoformed droplet asperities.

Referring to the detailed cross section of FIG. 10, most of the droplets harden during the thermoforming process to form asperities 64 projecting from the base 62 of the bedliner 60. Some of the droplets may harden and polymerize forming asperities 65 bonded to the surface of the base 62 while entrapping air. During thermoforming the entrapped air expands and explodes forming rough edges 56 which further enhance the coefficient of friction across the cargo carrying surface.

Another advantage of the thermoforming process is the enhancement of relief across the treated surface area, i.e. the area treated to form an antislip surface. The applied droplets at least partially shade the underlying portions of the HDPE from the radiant heating that is applied for carrying out the thermoforming. The differential pattern of shading across the treated surface area causes a relatively greater vacuum reduction or vacuum thinning of areas of the HDPE sheet between droplets, i.e. those areas that received full heating without shading, thereby enhancing the relief and elevation of the droplet asperities or pimples relative to the HDPE sheet. Plateau 67 schematically represents the raised or enhanced relief of the surface of the HDPE sheet in the areas directly beneath the asperities 64 and 65, although the actual boundary between the droplet material and the raised HDPE surface is difficult to determine because of the excellent bonding therebetween.

The process for selectively forming antislip surfaces can be applied to a variety of thermoformed products including flat configuration truck bed mats and slip sheets. The antislip surfaces can be formed selectively in the same manner as described with reference to the truck bed liner or across the entire surface of the truck bed mat or slip sheet. In the case of a flat configuration truck bed mat or slip sheet or other flat product, at least the portion of the sheet to be treated is still thermoformed on a vacuum molding surface with a shallow well to cause the differential thinning and enhanced relief of asperities formed by the droplets across the surface. For such applications, an undersize sheet can be treated and vacuum formed, and then the flat product portion is cut away from the thermoformed plastic sheet.

The process can also be used for selectively forming antislip surfaces on a variety of other thermoformed products including recreational products, such as slide bars, which require a low coefficient of friction slippery bottom but a high coefficient of friction antislip or nonskid top surface. Other applications include antislip walking surfaces and soles or heels of shoes such as bowling shoes. Another application is in providing antislip surfaces on swimming pool surfaces, walkways, and stairs, and shower, bathtub and bathroom surfaces thermoformed from sheets of ABS plastic or other thermoplastics. The antislip surface provides an ideal surface for human bare feet, imparting antislip properties with a high coefficient of friction without unnecessary abrasion, brittleness, or cutting. The invention can also be used for application on other barefoot walking surfaces, and particularly wet surface areas.

While the invention has been described with reference to particular example embodiments, it is intended to cover all modifications and equivalents within the scope of the following claims.

We claim:

1. A process for forming an antislip surface on at least a selected surface area of a product thermoformed from a sheet comprising a thermoplastic material, the process comprising performing the following steps in order:

applying droplets of a polymer onto at least a selected surface area of a sheet comprising a thermoplastic material to form a stippled pattern of bumps of said polymer on said selected surface area, wherein most of said bumps are separated from and non-contacting with each other, and said sheet remains substantially exposed between adjacent ones of said bumps;

at least partially hardening said bumps of said polymer;

heating said sheet to a thermoforming temperature; and thermoforming said sheet at said thermoforming temperature, wherein said heating and thermoforming steps together act to further harden said bumps to form hardened bumps providing a relatively higher coefficient of friction over said selected surface area.

2. The process of claim 1, wherein substantially all of said bumps are separated from and non-contacting with each other.

3. The process of claim 1, further comprising controlling said applying of droplets so that said bumps cover less than 50% of said selected surface area.

4. The process of claim 1, further comprising controlling said applying of droplets so that said bumps cover less than 25% of said selected surface area.

5. The process of claim 1, wherein substantially each of said bumps has a circular shape when viewed perpendicularly to said sheet.

6. The process of claim 1, wherein said heating and thermoforming steps together act to increase a projection height of said bumps relative to said sheet exposed between adjacent ones of said bumps.

7. The process of claim 6, wherein said bumps screen areas of said sheet underlying said bumps during said heating step to form a differential heating pattern corresponding to said stippled pattern.

8. The process of claim 1, comprising entrapping air in at least some of said bumps and bursting open said air-entrapping bumps by expanding said intrapped air during said steps of heating and forming.

9. The process of claim 1, wherein said heating and forming steps together act to durably bond said bumps to said sheet.

10. The process of claim 1, further comprising selecting said polymer so that when said product is finished, said hardened bumps have a greater hardness than said sheet.

11. The process of claim 1, further comprising a preliminary step of cleaning said selected surface area for removing contaminants and preparing an improved molecular bonding surface.

12. The process of claim 11, wherein said cleaning step comprises applying a flame to said selected surface area.

13. The process of claim 1, further comprising controlling diameters of said droplets to be in the range from $50\mu$ to $750\mu$.

14. The process of claim 1, wherein said bumps have sizes in the range from $50\mu$ to $750\mu$ when said product is finished.

15. The process of claim 1, further comprising a preliminary step of providing said polymer in a liquid form and forming said droplets of said liquid polymer.

16. The process of claim 15, wherein said steps of forming and applying said droplets comprise spraying a mist of said droplets from a spray nozzle.

17. The process of claim 16, further comprising masking said sheet to expose said selected surface area and cover other surface areas before said step of applying said droplets.

18. The process of claim 1, further wherein said polymer is a thermosetting elastomeric polymer.

19. The process of claim 18, further comprising mixing an adhesion promoter with said thermosetting elastomeric polymer in the range of 1% to 7% by weight of the mixture.

20. The process of claim 18, further comprising a step of mixing a polyurea prepolymer and an isocyanate to form said thermosetting elastomeric polymer.

21. The process of claim 18, wherein said polymer is a hybrid polyurea polyurethane polymer.

22. A thermoformed product thermoformed from a plastic sheet of thermoplastic material and having an antislip surface area thereon, wherein said antislip surface area is provided on a selected surface area of said plastic sheet, and includes separate pimples comprising a polymer material durably bonded to said plastic sheet, and wherein said pimples have a hardness greater than a hardness of said plastic sheet and below brittleness, said pimples provide tough macroscopic asperities causing a relatively higher coefficient of friction over said antislip surface area, said pimples cover less than 50% of said plastic sheet and leave more than 50% of said plastic sheet exposed between said pimples across said antislip surface area, said pimples have diameters in the range of $50\mu$–$750\mu$, and at least some of said pimples have rough edges thereon, formed by exploding entrapped gas in said at least some pimples during thermoforming of said plastic sheet.

23. A thermoformed product thermoformed from a plastic sheet of thermoplastic material and having an antislip surface area thereon, wherein said antislip surface area is provided on a selected surface area of said plastic sheet, and includes separate pimples comprising a polymer material durably bonded to said plastic sheet, and wherein said pimples have a hardness greater than a hardness of said plastic sheet and below brittleness, said pimples provide touch macroscopic asperities causing a relatively higher coefficient of friction over said antislip surface area, said pimples cover less than 50% of said plastic sheet and leave more than 50% of said plastic sheet exposed between said pimples across said antislip surface area, said pimples have diameters in the range of $50\mu$–$750\mu$, and at least some of said pimples respectively comprise a raised plateau of said thermoplastic material of said plastic sheet and a bump of said polymer material on top of said raised plateau.

24. A process for forming an antislip surface on at least a selected surface area of a thermoformed product, comprising the following steps in order:

(a) providing a base sheet comprising a layer of a first polymer;

(b) applying a plurality of individual non-interconnected islands comprising a second polymer onto at least a selected surface area of said base sheet, so that said islands cover less than 50% of said selected surface area;

(c) at least partially hardening said second polymer of said islands;

(d) heating said base sheet; and (e) thermoforming said base sheet at a thermoforming temperature by applying an air pressure differential across said base sheet in a mold, so as to bring a back side of said base sheet opposite said selected surface area into contact with a mold surface of said mold;

wherein said steps (d) and (e) together are carried out so as to further harden said second polymer of said islands, to durably bond said islands onto said base sheet, and to form of said islands hardened raised asperities that provide an increased coefficient of friction over said selected surface area.

25. The process of claim 24, wherein said first polymer is a thermoplastic polymer, and said second polymer is a thermosetting elastomeric polymer.

26. The process of claim 24, further comprising a step of preparing said second polymer by mixing a polyurea prepolymer and an isocyanate.

27. The process of claim 24, wherein said second polymer is a hybrid polyurea polyurethane polymer in which the polyurea predominates.

28. The process of claim 24, further comprising entrapping gas in at least some of said islands, and bursting open said gas-entrapping islands by expanding said entrapped gas during at least one of said steps (d) and (e).

29. The process of claim 24, wherein said steps (d) and (e) together are carried out so as to increase a projection height of said islands above said base sheet after said step (e) compared with before said step (d).

* * * * *

UNITED STATES PATENT AND TRADEMARK OFFICE
CERTIFICATE OF CORRECTION

PATENT NO. : 5,858,508
DATED : Jan. 12, 1999
INVENTOR(S) : Sturtevant et al.

It is certified that error appears in the above-identified patent and that said Letters Patent is hereby corrected as shown below:

On the Title page, under "FOREIGN PATENT DOCUMENTS"
delete lines 1 to 5;

on the Title page, page 2,
under "U.S. PATENT DOCUMENTS",
Col. 1, delete line 10;
Col. 2, delete lines 1, 4, 5 and 11;

on the Title page, page 2,
under "OTHER PUBLICATIONS", delete lines 4 to 6;

Col. 1, line 6, replace "APPLICATION" by --APPLICATIONS--;
line 15, after "OF" insert --THE--;

Col. 2, line 7, after "OF" insert --THE--;

Col. 14, line 43, after "provide" replace "touch" by --tough--.

Signed and Sealed this

Eighth Day of June, 1999

Attest:

Q. TODD DICKINSON

*Attesting Officer*   *Acting Commissioner of Patents and Trademarks*